3,414,367
PROCESS FOR MAKING N-SUBSTITUTED AMINO-ETHYLSULFONYLETHYL ETHERS OF CELLULOSE
Clark M. Welch and John D. Guthrie, New Orleans, La., assignors to the United States of America as represented by the Secretary of Agriculture
No Drawing. Continuation-in-part of application Ser. No. 70,891, Nov. 21, 1960. This application Nov. 6, 1963, Ser. No. 321,979
27 Claims. (Cl. 8—17)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of Ser. No. 70,891, filed Nov. 21, 1960 now abandoned.

This invention relates to the attachment of organic amines to cellulose with divinyl sulfone to give hitherto unknown N-substituted aminoethylsulfonylethyl ethers of cellulose, with the simultaneous formation of crosslinks in the cellulose by divinyl sulfone present as such or as its addition products with organic amines. The process offers a method of permanently attaching to cellulosic materials such as cotton yarn, fabric or fiber those dyes, water repellents, rotproofing agents, stiffening agents, flame retardants and other textile finishing agents which are amines. Simultaneous with such attachment, it is found that crosslinking of the cellulose occurs, rendering the fibers insoluble in cuprammonium solution. Under suitable conditions, durable wrinkle resistance in the wet state, or in both the wet and dry states, are imparted to cellulosic fabrics, along with increased dimensional stability. The introduction of aminoethylsulfonylethyl groups into the cellulose molecule also imparts to the latter an affinity for wool dyes which it does not possess in its unmodified state.

The overall process appears to consist of two competing reactions which are as follows:

$$R_1R_2NH + CH_2=CHSO_2CH=CH_2 + HO\text{-cell} \xrightarrow{X}$$
$$R_1R_2N-CH_2CH_2SO_2CH_2CH_2-O \text{ cell}$$

$$CH_2=CHSO_2CH=CH_2 + 2HO\text{-cell} \xrightarrow{X}$$
$$\text{cell } O-CH_2CH_2SO_2CH_2CH_2-O \text{ cell}$$

Here $R_1$ and $R_2$ are radicals hereinafter defined, HO—cell is a portion of the cellulose chain, and X is a catalyst. The process may be carried out in a single step by applying the reagents and catalyst in one solution to the cellulose, followed by curing. It may also be conducted in two separate steps as follows:

STEP 1

$$R_1R_2NH + CH_2=CHSO_2CH=CH_2 \rightarrow$$
$$R_1R_2N-CH_2CH_2SO_2CH=CH_2$$

STEP 2

$$R_1R_2N-CH_2CH_2SO_2CH=CH_2 + HO\text{-cell} \rightarrow$$
$$R_1R_2N-CH_2CH_2SO_2CH_2CH_2-O \text{ cell}$$

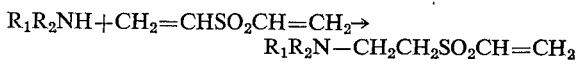

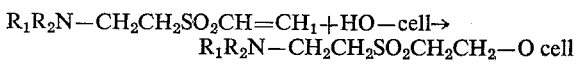

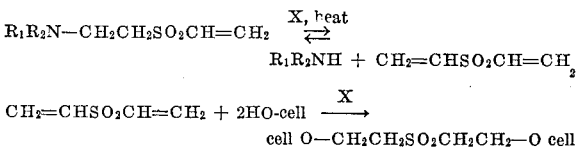

The product of step 1 is a 1:1 adduct of the amine with divinyl sulfone. Many such adducts or addition products have been made previously but they have never hitherto been applied to cellulose in the presence of a catalyst to effect etherification and crosslinking by reaction with cellulosic hydroxyl groups.

A number of the amine adducts of divinyl sulfone are water-soluble. Such adducts almost invariably give odorless solutions, in contrast to divinyl sulfone itself, which alone or in solution is highly lachrymatory and irritating on inhalation. For this reason it is frequently advantageous to apply the amine adduct and the catalyst to the cellulose and subsequently cure (the two-step method).

Regardless of which method is used, it is possible to exercise some control over the extent to which attachment of aminoethylsulfonylethyl groups occurs, as compared with the crosslinking reaction that competes with it. In some cases the attachment reaction may be made to predominate while in other cases crosslinking predominates, depending on the amine, catalyst, curing conditions, and after-treatments chosen.

Regarding amines $R_1R_2NH$ which may be used, $R_1$ may be a substituted or unsubstituted group of the alkyl or aryl type. $R_2$ may be a substituted or unsubstituted alkyl group, or a part of $R_1$ as in heterocyclic amines and etimines. When $R_1$ is aryl, $R_2$ may also be hydrogen. Substituents on $R_1$ and $R_2$ may include one or more amino, hydroxyl, carboxyl or other active hydrogen groups, as well as groups which do not have active hydrogen. Different types of amines show differing reactivity in the above process. Simple primary aliphatic amines are much less readily attached to cellulose with divinyl sulfone than are other amines, apparently because the former give exceptionally stable nonionic cyclic adducts with divinyl sulfone. Secondary aliphatic amines are on the other hand readily attached. They form reactive adducts with divinyl sulfone in aqueous solution at room temperature, and the resulting solutions can be freed of traces of unreacted divinyl sulfone by extraction with an inert organic solvent in which divinyl sulfone is readily soluble, such as benzene or chloroform. The extraction removes the divinyl sulfone, but leaves the amine adduct in the aqueous phase as an odorless and stable solution to which catalyst may then be added. Ammonia can readily be attached to cellulose since its 1:1 adduct with divinyl sulfone is thiomorpholine 1,1-dioxide, which, as a secondary amine, reacts with a second mole of divinyl sulfone yield a cellulose-reactive adduct. The adducts of divinyl sulfone with urea may be freed of unreacted divinyl sulfone in a similar manner. Divinyl sulfone also adds to hydroxy compounds, and when the amine used contains one or more hydroxyl groups, graft polymerization on cellulose is frequently obtained, imparting to the fabric in some cases high wrinkle resistance in both the wet and dry state. Polyamines containing a plurality of secondary amino groups or containing both primary and secondary amino groups in the same molecule also are readily attached.

When bulky molecules such as amine dyes are to be attached to cellulosic yarn or fabric, the process is frequently most efficient when divinyl sulfone is used in excess of the amount required in forming an adduct with the amine. Excess divinyl sulfone gives rise to irritating and lachrymatory vapors, however, and it is advantageous to use in place of free divinyl sulfone an adduct formed from N moles of divinyl sulfone and one mole of urea or a polyamino compound containing a total of N primary and secondary amino groups per molecule. With mild catalyst, such an adduct is in some cases more reactive than divinyl sulfone itself.

Catalysts which may be used in the above cellulose etherification reactions are bases such as alkali metal carbonates and bicarbonates, alkali or alkaline earth metal hydroxides, and organic quaternary ammonium carbonates, bicarbonates and hydroxides. In the absence of a catalyst the etherification does not proceed. Where the catalyst is applied to fabric or yarn in the same solution as the amine and the divinyl sulfone or their adduct, the catalyst concentration should not be so high that it causes the amine or the adduct to precipitate, or the sulfone to react with the water present. Although concentrations of 0.5–10% may be used in such treatments, the preferred concentration is in the range 1.0–2.5%. Curing temperatures for carbonate or bicarbonate catalysts may be 110–160° C. or preferably 135–150° C. for 2–10 minutes. For hydroxide catalysts, curing may be at 80–160° C. with the best strength retention at 105–125° C. The tensile strength and also the wrinkle resistance in the wet state are considerably increased by aftermercerization of the finished fabric with 17–35% sodium hydroxide for 3–30 minutes at room temperature, with only negligible decreases in nitrogen content. When cellulosic fabric or yarn impregnated with the amine and the divinyl sulfone, or with the amine-sulfone adduct, is subsequently treated with hydroxide catalyst, mercerization-strength alkali is preferable since it effects the desired reactions at 15–70° C. and at the same time produces the above-mentioned effects of after-mercerization. The mercerization of fabric prior to the etherification process results in some cases in greater increases in wrinkle resistance in the wet state than does aftermercerization. The use of both premercerization and aftermercerization gives still higher wrinkle resistance.

The following examples illustrate some of the procedures possible in obtaining varying degrees of cellulose substitution and of crosslinking. Crease-recovery angles cited are double the values measured in the warp direction by the Monsanto crease-recovery test. The adaptation of Lawrence and Phillips, Am. Dyestuff Reptr., 45, page 548 (1956) was used for crease-recovery tests in the wet state. A Scott tester was used for breaking strength determination.

Example 1

To 10 ml. (0.10 mole) of divinyl sulfone and 20 ml. of water was added with stirring 20 ml. of 25% aqueous dimethylamine (0.11 mole) with cooling to keep the temperature below 45° C. The resulting solution was extracted with three 20-ml. portions of benzene to remove traces of divinyl sulfone. To the separated aqueous phase (44–46 ml.) was added 1.50 ml. of 30% sodium hydroxide. The solution was padded in two dips, two nips onto slack-mercerized 88 x 80 scoured, desized, and bleached cotton printcloth, to a wet pickup of 110–120%. The cloth was ovencurred for 10 minutes at 115° C., and was then washed, dried, and air-equilibrated. It showed a weight gain of 8% which was unchanged by treatment for 30 minutes with 20% sodium hydroxide at room temperature. Again washed, dried, and equilibrated, the cloth contained 1.99% sulfur and 0.39% nitrogen. The wet crease-recovery angle was 303°; that for the original, mercerized untreated fabric was 239°. The breaking strength was 65% of the original value. The fabric was deeply dyed by wool dyes such as Kiton Fast Red 3GLL in dilute acetic acid, whereas untreated fabric was undyed.

The same procedure used on unmercerized printcloth resulted in a weight gain of 6%, which on after-mercerization increased to 7%. The cloth then had a sulfur content of 0.79%, a nitrogen content of 0.22%, a wet crease recovery of 293° and a breaking strength 82% of that for untreated fabric. Wet wrinkle resistance on hand crumpling was inferior to that for treated premercerized fabric. Fibers of both fabrics were insoluble in cuprammonium hydroxide solution, in which untreated fibers dissolved immediately. The treated fabrics were deeply dyed by wool dyes such as Kiton Fast Red 3GLL in dilute acetic acid, indicating the presence of amino groups. Untreated fabric was undyed.

Example 2

The use of 1.0 g. of sodium carbonate monohydrate in place of sodium hydroxide as the catalyst in Example 1, and a curing temperature of 135° C., resulted in a weight gain of 7% on treating unmercerized fabric. Characteristics of the treated fabric were: sulfur content—1.53%, nitrogen content—0.30%, breaking strength —59% of the original value, together with a high affinity for wool dyes and insolubility in cuprammonium.

With a curing time of only five minutes, the results on treating mercerized and unmercerized printcloth both with and without mercerization subsequent to treatment were as follows:

| | Wet Crease Recovery, ° | Loss in Breaking Strength, percent |
|---|---|---|
| Unmercerized | 184 | 36 |
| Premercerized | 291 | 41 |
| Aftermercerized | 291 | 15 |
| Pre- and aftermercerized | 305 | 28 |

The two premercerized fabrics showed greater wet wrinkle resistance on hand crumpling than those which were not premercerized.

Example 3

To 10 ml. (0.10 mole) of divinyl sulfone and 20 ml. of water was added with stirring 5 g. (0.058 mole) of piperazine in 15 ml. of water with stirring and cooling to keep the temperature below 45° C. The resulting solution was extracted with three 20 ml. portions of benzene. To the separated aqueous phase was added 14 ml. of water and 1.0 g. of sodium carbonate monohydrate. The solution was padded in one dip, one nip on 80 x 80 cotton printcloth. The cloth was cured at 135° for 20 minutes, washed, dried, and airequilibrated. The weight gain of 6.7% was increased to 7.4% on mercerization with 20% sodium hydroxide for 30 minutes. The washed, dried, and equilibrated cloth contained 1.28% sulfur and 0.63% nitrogen. The tensile strength of the aftermercerized fabric was equal to that for untreated mercerized fabric. The cloth was deeply dyed by wool dyes.

Example 4

To 10 ml. (0.10 mole) of divinyl sulfone in 10 ml. of water was added with stirring and cooling 3.4 ml. (0.05 mole) of 28% ammonia in 5 ml. of water. Then 33 ml. of water was added, the solution was extracted with three 20 ml. portions of benzene and to the separated aqueous phase was added 1.0 g. of sodium carbonate monohydrate. The solution was padded in one dip, one nip on 80 x 80 printcloth which was then ovencured at 135° C. for 10 minutes. After being washed, dried, and airequilibrated the cloth showed an increase in weight of 6%, which rose to 8% on aftermercarization in 20% sodium hydroxide for 15 minutes. Fibers of the cloth were insoluble in cuprammonium hydroxide. The fabric showed a medium effinity for wool dyes. It possessed a nitrogen content of 0.36%, a sulfur content of 1.63%, and a moisture content of 7.1%.

Example 5

To 10 ml. (0.10 mole) of divinyl sulfone was added dropwise with stirring and cooling 3.6 ml. (0.05 mole) of 71% ethylamine. Then 30 ml. of water was added. The mixture was extracted with benzene as in previous examples. To the separated aqueous phase was added 2.5% by weight of sodium carbonate. The solution was applied in two dips, two nips to 80 x 80 cotton printcloth, cured at 135° C. for 10 minutes, washed, dried, and equilibrated. The cloth had a somewhat greater affinity for wool dyes than did untreated fabric. Fibers of the treated material were insolubel in cuprammonium hydroxide solution although much swelling occurred to indicate crosslinking was slight. The fabric showed no improvement in wet wrinkle resistance. There was no appreciable gain in weight.

Example 6

To 5 ml. (0.05 mole) of divinyl sulfone in 5 ml. of water was added with cooling 5.25 g. (0.05 mole) of diethanolamine in 5 ml. of water. Finally the mixture was warmed briefly to 60° to complete the reaction. The solution was extracted with benzene as in previous examples. After addition of 0.50 g. of sodium carbonate monohydrate, the solution was applied to 80 x 80 cotton printcloth and cured as in Example 5. The cloth showed after drying and equilibration a weight increase of 15%, and contained 2.05% sulfur as well as 0.68% nitrogen. It was very deeply dyed by wool dyes, and exhibited moderate crease-recovery angles when wet (271°) or when dry (260°). It retained 71% of the breaking strength of untreated fabric.

Example 7

A solution of N-ethyl-N-(2,3 - dihydroxypropyl)amine was prepared from 7.2 ml. (0.1 mole) of 71% ethylamine to which was added in four portions 7.4 g. (0.1 mole) of glycidol, with cooling as necessary to keep the temperature below 50° C. The mixture was allowed to stand until heat evolution ceased, and after 15 minutes longer, 10 ml. of water was added. The solution was added to 10 ml. (0.1 mole) of divinyl sulfone in 20 ml. of water, and the mixture was warmed to 50° C. for 10 minutes. After extraction with benzene as in previous examples and addition to the separated aqueous phase of 2.2% by weight of sodium carbonate monohydrate, the solution was applied in two dips, two nips to 80 x 80 cotton printcloth. Curing was at 135° C. for 10 minutes. The washed, dried and equilibrated fabric showed a weight gain of 28%. This was unaffected by extraciton of the fabric with boiling glacial acetic acid. Again washed, dried, and equilibrated, the cloth contained 2.51% sulfur and 0.70% nitrogen, and was deeply dyed by wool dyes. Fabric was also treated with half the above concentration of amine-sulfone adduct in 2.2% sodium carbonate. The original wet and dry crease recovery (160° and 165°) was increased as follows:

| Conc. | Curing Temp., °C. | Weight Gain, Percent | Wet Recovery, ° | Dry Recovery, ° | Strength Loss, Percent |
| --- | --- | --- | --- | --- | --- |
| Full | 135 | 28 | 316 | 266 | 28 |
| Half | 135 | 14 | 302 | 259 | 33 |
| Do | 115 | 16 | 275 | 240 | 23 |

Example 8

To a solution of 0.10 g. of basic fuchsin dissolved in 10 ml. of methanol was added 0.50 ml. of divinyl sulfone in 20 ml. of water. The solution was filtered and padded in two dips, two nips on 80 x 80 cotton printcloth. The cloth was ovendried for 5 minutes at 135–150° C. and was then soaked in 25–30% sodium hydroxide for 3–8 minutes at room temperature. The cloth was washed, and unreacted dye was extracted with boiling glacial acetic acid. The fabric remained an intense purple (P 3/10 on the Munsell color scale, 41–L–11 on the Maerz and Paul scale). The breaking strength was equal to that of untreated slack-mercerized fabric. Concentrated mineral acids such as hydrochloric or phosphoric acids did not remove the dye. Strong bases such as concentrated ammonia or 20% sodium hydroxide had no observable effect at room temperature. If divinyl sulfone were omitted from the treating solution in the above procedure, the washed and extracted cotton remained undyed.

Example 9

A solution containing 0.5–0.8% of Acridine Red and 1.5% divinyl sulfone was padded on 80 x 80 cotton printcloth in the usual way and ovendried at 135–150° C. for 5 minutes. The cloth was soaked in 25–30% sodium hydroxide for 5 minutes and washed. It was an intense deep pink (49–J–10 on the Maerz and Paul scale), and fluoresced orange under ultraviolet light. If divinyl sulfone were omitted from the treatment, the cotton remained undyed.

Auramine attached to cotton by the above method gave an intense yellow color.

Example 10

A solution containing 0.3% of p-aminoazobenzene and 1.5% divinyl sulfone in benzene was applied to 80 x 80 cotton printcloth, dried at 140° for 5 minutes, and soaked in 30% sodium hydroxide for 5 minutes at room temperature. An intense yellow color (9–L–3 on the Maerz and Paul scale) was obtained, which was not removable by extraction with boiling glacial acetic acid or boiling pyridine.

Example 11

To 4 ml. (0.04 mole) of divinyl sulfone in 40 ml. of water was added 1.76 g. (0.021 mole) of piperazine in 20 ml. of water. The solution was extracted with three 20 ml. portions of benzene. To the separated aqueous phase (60 ml.) was added 0.60 g. of Acridine Red and 1.2 g. of sodium carbonate monohydrate. The solution was padded in one dip and one nip on 80 x 80 cotton printcloth, and cured at 150° C. for 5 minutes. The washed cloth was a deep shade of pink (deeper than RP 6/5 on the Munsell color scale, or than 49–1–7 on the Maerz and Paul scale). The use of one-third the above concentration of the divinyl sulfone adduct with piperazine gave a slightly lighter shade.

Example 12

A solution of the piperazine adduct of divinyl sulfone prepared and extracted as in Example 11 was diluted with two volumes of water, and 1.0% by weight of auramine was added, followed by 0.5% by weight of glacial acetic acid to neutralize the adduct and bring the dye into solution. After the addition of 3.3% by weight of sodium bicarbonate, the solution was applied in one dip and one nip to 80 x 80 cotton printcloth to a wet pickup of 105%. This was cured at 135° C. for 5 minutes, giving a weight gain of 1.5% and a very deep yellow color (between 9–K–2 and 9–L–2 on the Maerz and Paul scale).

Example 13

To 0.50 ml. (0.005 mole) of divinyl sulfone in 20 ml. of water was added 0.22 g. (0.0026 mole) of piperazine in 10 ml. of water. The solution was extracted with three 20 ml. portions of benzene. To the separated aqueous phase was added 0.30 g. (0.0011 mole) of Acridine Red. The mixture was stirred for 15 min., filtered, and padded on 80 x 80 cotton printcloth in two dips and two nips. The cloth was dried at 135° C. for 5 minutes and allowed to equilibrate in air. It was then soaked in 25% sodium hydroxide for 5 minutes. Washed, dried, and equilibrated, it showed good strength, and was intensely red (49–J–9 on the Maerz and Paul color scale).

Example 14

To a stirred solution of 0.22 g. (0.0012 mole) of tetraethylenepentamine in 30 ml. of water was added 0.50 ml. (0.005 mole) of divinyl sulfone, and after 10 minutes, 0.08 ml. (0.001 mole) of 37% hydrochloric acid was added, giving a clear solution. The mixture was extracted with three 20 ml. portions of benzene, avoiding vigorous agitation which would cause emulsification. To the separated aqueous phase was added 0.10 g. of Acridine Red and 4 ml. of dimethylformamide, the latter being a solubilizing agent. The solution was padded on 80 x 80 cotton printcloth in two dips and two nips, and was dried at 135° C. for 5 minutes. It was then treated with 10% sodium carbonate monohydrate and cured at 135° C. for 10 minutes. The washed and dried fabric was a deep red (49–A–8 on the Maerz and Paul color scale).

Example 15

To a solution of 3 g. (0.05 mole) of urea, 1.2 ml. of 5% sodium hydroxide and 8 ml. of water at 16–19° C. was added 20 ml. (0.10 mole) of divinyl sulfone, with stirring. After 30 minutes, the temperature was allowed to rise, causing the two liquid phases to merge. After standing at room temperature for one hour, the solution was diluted with 60–80 ml. of water and extracted with three 20 ml. portions of benzene, avoiding vigorous agitation which tended to emulsify the mixture. To the separated aqueous phase was added 2% by weight of sodium carbonate monohydrate and 15 ml. of water. The solution was padded on 80 x 80 cotton printcloth in two dips and two nips to a wet pickup of 126%. The cloth was cured at 135° C. for 5 minutes, washed, dried and equilibrated. The weight increase was 5%. The sulfur content was 1.18%, while the nitrogen content was 0.21%. Fibers of the treated cotton were insoluble in cuprammonium hydroxide solution.

Example 16

A solution of the urea adduct of divinyl sulfone prepared and extracted as in Example 15 was diluted with three volumes of water, and 1% by weight of Acridine Red was added, mollowed by 2% of sodium carbonate monohydrate. The solution was padded in one dip and one nip on 80 x 80 cotton printcloth to a wet pickup of 95–99%. Cured at 135–150° C. for 5 minutes, washed and extracted with boiling glacial acetic acid, the cloth remained a very intense fuchsia (49–C–11 on the Maerz and Paul scale).

Example 17

A solution of the urea adduct of divinyl sulfone prepared and extracted as in Example 15 was diluted with three volumes of water, and 1% by weight of auramine was added, followed by 2.5% of sodium bicarbonate. The solution was applied in one dip and one nip to 80 x 80 cotton printcloth to a wet pickup of 100%. The cloth was cured at 100° C. for 5 minutes, and after being washed, it remained an intense yellow (17–J–1 on the Maerz and Paul scale). If the urea adduct of divinyl sulfone were omitted in the above procedure, the cloth retained negligible color after being washed.

Example 18

To 5 ml. (0.05 mole) of divinyl sulfone in 5 ml. of water was added 9.8 g. (0.05 mole) of sodium iminodiacetate monohydrate in 25 ml. of water. The solution was extracted with three 20 ml. portions of benzene, avoiding emulsification by too vigorous agtation. To the separated aqueous phase was added 1.0 g. of sodium carbonate monohydrate. The solution was applied in two dips and two nips to 80 x 80 cotton printcloth to a wet pickup of 140°. The cloth was cured at 135° C. for 10 minutes, washed, dried, and equilibrated. The weight gain was 6%. The cloth contained 0.67% sulfur and 0.20% nitrogen. Fibers of the cloth were insoluble in cuprammonium hydroxide solution.

We claim:

1. As a polymeric material, the ternary addition product of a secondary amine, divinyl sulfone, and cellulose, the said ternary addition product being represented by the structure:

$$R_1R_2NCH_2CH_2SO_2CH_2CH_2O\text{---Cell}$$

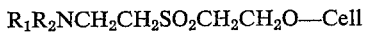

in which structure $R_1$ is a member selected from the group consisting of alkyl and aryl radicals, $R_2$ is an alkyl group, and Cell is a divinyl sulfone-crosslinked cellulose chain, said ternary addition product being prepared by (1) reacting in aqueous solution and at a temperature not exceeding about 45° C., about from ½ to 1 mole of said secondary amine per mole of said divinyl sulfone to form a reaction product which is the 1:1 adduct of said secondary amine and divinyl sulfone, (2) extracting said reaction product with a solvent selected from the group consisting of benzene and chloroform to remove unreacted divinyl sulfone therefrom, (3) treating cellulose with an aqueous solution of the divinyl sulfone-free reaction product and about from 1 to 2.5 weight percent, based on the aqueous solution, of an alkaline catalyst selected from the group consisting of alkali metal carbonates, alkali metal bicarbonates, alkali metal hydroxides, quaternary ammonium bicarbonates, quaternary ammonium carbonates, and quaternary ammonium hydroxides, and (4) heating the thus-treated cellulose at a temperature of about from 80° C. to 160° C. for about from 2 to 10 minutes, the shorter times being employed with the higher temperatures, to form said ternary addition product.

2. As a polymeric material, the ternary addition product of a secondary amine, divinyl sulfone, and cellulose, the said ternary addition product being represented by the structure:

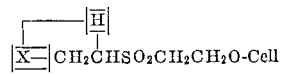

in which structure X with the associated hydrogen atom as indicated is a secondary amine selected from the group consisting of dimethylamine, diethanolamine, thiomorpholine-1,1-dioxide, N-ethyl-N-(2,3-dihydroxypropyl)amine, piperazine, tetraethylenepentamine, and sodium iminodiacetate, and ---Cell is a divinyl sulfone-crosslinked cellulose chain, said ternary addition product being prepared by (1) reacting in aqueous solution and at a temperature not exceeding about 45° C., about from ½ to 1 mole of said secondary amine per mole of said divinyl sulfone to form a reaction product which is the 1:1 adduct of said secondary amine and divinyl sulfone, (2) extracting said reaction product with a solvent selected from the group consisting of benzene and chloroform to remove unreacted divinyl sulfone therefrom, (3) treating cellulose with an aqueous solution of the divinyl sulfone-free reaction product and about from 1 to 2.5 weight percent, based on the aqueous solution, of an alkaline catalyst selected from the group consisting of alkali metal carbonates, alkali metal bicarbonates, alkali metal hydroxides, quaternary ammonium bicarbonates, quaternary ammonium carbonates, and quaternary ammonium hydroxides, and (4) heating the thus-treated cellulose at a temperature of about from 80° C. to 160° C. for about from 2 to 10 minutes, the shorter times being employed with the higher temperatures, to form said ternary addition product.

3. The polymeric material of claim 2 wherein the secondary amine is dimethylamine.

4. The polymeric material of claim 2 wherein the secondary amine is diethanolamine.

5. The polymeric material of claim 2 wherein the secondary amine is thiomorpholine-1,1-dioxide.

6. The polymeric material of claim 2 wherein the secondary amine is N-ethyl-N-(2,3-dihydroxypropyl)amine.

7. The polymeric material of claim 2 wherein the secondary amine is piperazine.

8. The polymeric material of claim 2 wherein the secondary amine is tetraethylenepentamine.

9. The polymeric material of claim 2 wherein the secondary amine is sodium iminodiacetate.

10. As a colored polymeric material, the ternary addition product of a colored aromatic amine, divinyl sulfone, and cellulose, the said ternary addition product being represented by the structure:

$$R_1R_2NCH_2CH_2SO_2CH_2CH_2O—Cell$$

in which structure $R_1$ is an aryl radical containing a chromophoric group, $R_2$ is a member selected from the group consisting of an alkyl radical and hydrogen, and —Cell is a divinyl sulfone-crosslinked cellulose chain, said ternary addition product being prepared by (1) reacting in aqueous solution and at a temperature not exceeding about 45° C., about from ½ to 1 mole of said colored aromatic amine per mole of said divinyl sulfone to form a reaction product which is the 1:1 adduct of said colored aromatic amine and divinyl sulfone, (2) extracting said reaction product with a solvent selected from the group consisting of benzene and chloroform to remove unreacted divinyl sulfone therefrom, (3) treating cellulose with an aqueous solution of the divinyl sulfone-free reaction product and about from 1 to 2.5 weight percent, based on the aqueous solution, of an alkaline catalyst selected from the group consisting of alkali metal carbonates, alkali metal bicarbonates, alkali metal hydroxides, quaternary ammonium bicarbonates, quaternary ammonium carbonates, and quaternary ammonium hydroxides, and (4) heating the thus-treated cellulose at a temperature of about from 80° C. to 160° C. for about from 2 to 10 minutes, the shorter times being employed with the higher temperatures, to form said ternary addition product.

11. As a colored polymeric material, the ternary addition product of a colored aromatic amine, divinyl sulfone, and cellulose, the said ternary addition product being represented by the structure:

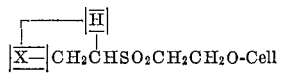

in which structure X with the associated hydrogen atom as indicated is an amino group containing-dye selected from the group consisting of basic fuchsin, Acridine Red, p-aminoazobenzene, and auramine; and —Cell is a divinyl sulfone-crosslinked cellulose chain, said ternary addition product being prepared by (1) reacting in aqueous solution and at a temperature not exceeding about 45° C., about from ½ to 1 mole of said colored aromatic amine per mole of said divinyl sulfone to form a reaction product which is the 1:1 adduct of said colored aromatic amine and divinyl sulfone, (2) extracting said reaction product with a solvent selected from the group consisting of benzene and chloroform to remove unreacted divinyl sulfone therefrom, (3) treating cellulose with an aqueous solution of the divinyl sulfone-free reaction product and about from 1 to 2.5 weight percent, based on the aqueous solution, of an alkaline catalyst selected from the group consisting of alkali metal carbonates, alkali metal bicarbonates, alkali metal hydroxides, quaternary ammonium bicarbonates, quaternary ammonium carbonates, and quaternary ammonium hydroxides, and (4) heating the thus-treated cellulose at a temperature of about from 80° to 160° C. for about from 2 to 10 minutes, the shorter times being employed with the higher temperatures, to form said ternary addition product.

12. The colored polymeric material of claim 11 wherein the amino group containing dye is basic fuchsin.

13. The colored polymeric material of claim 11 wherein the amino group containing dye is acridine red.

14. The colored polymeric material of claim 11 wherein the amino group containing dye is p-aminoazobenzene.

15. The colored polymeric material of claim 11 wherein the amino group containing dye is auramine.

16. As a colored polymeric material, the quaternary addition product of (1) a dye containing in each molecule at least one amino group selected from the class consisting of primary aromatic amino and ketimino; (2) urea; (3) divinyl sulfone; and (4) cellulose: said quaternary addition product being formed by impregnating the cellulose in an aqueous medium with the dye together with the adduct of divinyl sulfone and urea, the mole ratio of divinyl sulfone to urea in the adduct being 2:1, there being present in the said aqueous medium an alkaline catalyst selected from the group consisting of alkali metal hydroxides, alkali metal carbonates, and alkali metal bicarbonates, the reaction being carried out at temperatures of from 15° to 160° C., the higher temperatures being employed with the less alkaline catalysts.

17. The colored polymeric material of claim 16 wherein the dye is acridine red.

18. The colored polymeric material of claim 16 wherein the dye is auramine.

19. As a colored polymeric material, the quaternary addition product of (1) a dye containing in each molecule at least one nitrogen atom selected from the group consisting of primary aromatic amino nitrogen and ketimino nitrogen; (2) a polyamine having a plurality of secondary amino groups and selected from the group consisting of piperazine and tetraethylenepentamine; (3) divinyl sulfone; and (4) cellulose: said quaternary addition product being formed by impregnating the cellulose in an aqueous medium with said dye together with an adduct of divinyl sulfone and said polyamine, the mole ratio of divinyl sulfone to the polyamino in the adduct being equal to the total number of primary and secondary amino groups per mole of the said polyamine, there being present in the aqueous medium an alkaline catalyst selected from the group consisting of alkali metal hydroxides, alkali metal carbonates, and alkali metal bicarbonates, the reaction being carried out at temperatures of from 15° to 160° C., the higher temperatures being employed with the less alkaline catalysts.

20. The colored polymeric material of claim 19 wherein the polyamine is piperazine.

21. The colored polymeric material of claim 19 wherein the polyamine is tetraethylenepentamine.

22. A process for preparing N-substituted aminoethyl-sulfonylethyl ethers of cellulose which comprises reacting cellulose in the presence of water and 0.5 to 10% of an alkaline catalyst selected from the group consisting of alkali metal carbonates, alkali metal bicarbonates, alkali metal hydroxides, quaternary ammonium bicarbonates, quaternary ammonium carbonates and quaternary ammonium hydroxides, with divinyl sulfone and an amine selected from the group consisting of aromatic ketimines, linear polyamines having the structure $NH_2(CH_2CH_2NH)_xCH_2CH_2NH_2$ where $x$ is 1–3, primary aromatic amines, alpha-amino acids in which the alpha-amino group is a secondary amino group, and amines having the structure $R_1R_2NH$ where $R_1$ is selected from the group consisting of alkyl and aryl and radicals and $R_2$ is an alkyl radical, the mole ratio of divinyl sulfone to amine being not less than the number of primary and secondary amino groups per amine molecule, the reaction being brought to completion at a temperature of from 80° to 160° C.

23. A process for simultaneously bonding urea and an amine to cellulose which process comprises the process of claim 22, wherein divinyl sulfone is replaced with an addition product of divinyl sulfone and urea, the mole ratio of divinyl sulfone to urea in the addition product being 2:1, the cellulose being reacted with the divinyl sulfone-urea addition product and the amine in the presence of the alkaline catalyst.

24. A process for simultaneously bonding to cellulose, a polyamine having a plurality of secondary amino groups and selected from the group consisting of piperazine and tetraethylenepentamine and an amine selected from the group consisting of secondary alkylamines, primary aromatic amines, N-alkyl-N-aryl amines and ketimines, which process comprises the process of claim 22 wherein divinyl sulfone is replaced with an addition product of divinyl sulfone and the said polyamine, the moles of divinyl sulfone in the said addition product being equal to the total number of primary and secondary amino groups per mole of the said polyamine, the cellulose being reacted in the presence of the alkaline catalyst with the said divinyl sulfone-polyamine addition product and the said amine.

25. A process for preparing N-substituted aminoethylsulfonylethyl ethers of cellulose comprising wetting the cellulose with a solvent containing divinyl sulfone and an amine selected from the group consisting of aromatic ketimines, linear polyamines having the structure $NH_2(CH_2CH_2NH)_xCH_2CH_2NH_2$ where $x$ is 1–3, primary aromatic amines, alpha-amino acids in which the alpha amino group is a secondary amino group, and amines having the structure $R_1R_2NH$ where $R_1$ is selected from the group consisting of alkyl and aryl radicals and $R_2$ is an alky radical, the mole ratio of divinyl sulfone to amine being not less than the number of primary and secondary amino groups per amine molecule, removing the solvent from the treated cellulose by volatilization, and treating the solvent-free cellulose at a temperature of from 15° to 70° C. with an aqueous solution containing from 17 to 35% of a hydroxide selected from the group consisting of alkali metal hydroxides and quaternary ammonium hydroxides.

26. The process for simultaneously bonding urea and an amine to cellulose, which comprises the process of claim 25 wherein the divinyl sulfone is replaced with an addition product of divinyl sulfone and urea, the mole ratio of divinyl sulfone to urea in the addition product being 2:1, the cellulose being reacted with the divinyl sulfone-urea addition product and the amine in the presence of the said hydroxide.

27. A process for preparing N-substituted aminoethylsulfonylethyl ethers of cellulose which comprises reacting in aqueous solution, divinyl sulfone with an amine selected from the group consisting of aromatic ketimines, linear polyamines having the structure $NH_2(CH_2CH_2NH)_xCH_2CH_2NH_2$ where $x$ is 1–3, primary aromatic amines, alpha-amino acids in which the alpha-amino group is a secondary amino group, and amines having the structure $R_1R_2NH$ where $R_1$ is selected from the group consisting of alkyl and aryl radicals and $R_2$ is an alkyl radical, the mole ratio of divinyl sulfone to amine being not less than the number of primary and secondary amino groups per amine molecule, thereby to produce, as a reaction product, an adduct of the divinyl sulfone and said amine in aqueous solution, extracting said aqueous solution of the reaction product with a water-immiscible inert solvent in which divinyl sulfone is soluble thereby to remove all unreacted divinyl sulfone, and reacting the thus-extracted aqueous solution of said reaction product with cellulose in the presence of about 0.5 to 10% of an alkaline catalyst selected from the group consisting of alkali metal carbonates, alkali metal bicarbonates, alkali metal hydroxides, quaternary ammonium bicarbonates, quaternary ammonium carbonates, and quaternary ammonium hydroxides, at a temperature of about from 80° to 160° C. to produce an N-substituted aminoethylsulfonylethyl ether of cellulose.

References Cited
UNITED STATES PATENTS

| | | | |
|---|---|---|---|
| 2,539,704 | 1/1951 | Schoene et al. | 8—116X |
| 2,579,871 | 12/1951 | Schoene | 8—127.5 |
| 2,623,807 | 12/1952 | Schappel | 8—116.2 |
| 2,917,540 | 12/1957 | Shaw et al. | 8—120X |
| 2,940,817 | 6/1960 | Browne | 8—116.2 |
| 2,988,417 | 6/1961 | Emmons et al. | 8—116 |
| 3,000,762 | 9/1961 | Tesoro | 8—120X |
| 3,005,852 | 10/1961 | Freyermuth et al. | 8—120X |
| 3,031,435 | 4/1962 | Tesoro | 8—115.6X |
| 3,046,075 | 6/1962 | Kantner et al. | 8—120X |
| 3,106,439 | 10/1963 | Valentine et al. | 8—116 |

NORMAN G. TORCHIN, *Primary Examiner.*

J. CANNON, *Assistant Examiner.*